United States Patent
Wu

(10) Patent No.: US 10,863,279 B1
(45) Date of Patent: Dec. 8, 2020

(54) VOICE-CONTROLLED BLUETOOTH HEADSET

(71) Applicant: Peng Wu, Shanghai (CN)

(72) Inventor: Peng Wu, Shanghai (CN)

(73) Assignee: Wudi Industrial (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/795,409

(22) Filed: Feb. 19, 2020

(30) Foreign Application Priority Data

Nov. 26, 2019 (CN) .................. 2019 2 2069168 U

(51) Int. Cl.
| | | |
|---|---|---|
| *H04R 1/10* | (2006.01) | |
| *H04R 5/033* | (2006.01) | |
| *G10L 15/02* | (2006.01) | |
| *G10L 15/22* | (2006.01) | |
| *H04R 9/06* | (2006.01) | |

(52) U.S. Cl.
CPC ............. *H04R 5/033* (2013.01); *G10L 15/02* (2013.01); *G10L 15/22* (2013.01); *H04R 2201/107* (2013.01); *H04R 2420/07* (2013.01)

(58) Field of Classification Search
CPC .............. H04R 5/033; H04R 2201/107; H04R 2420/07; G10L 15/02; G10L 15/22
USPC ............................................ 381/74, 104–109
See application file for complete search history.

(56) References Cited

U.S. PATENT DOCUMENTS

| 2009/0204410 A1* | 8/2009 | Mozer ..................... G10L 15/30 704/275 |
| 2019/0007765 A1* | 1/2019 | Pi ............................ H04R 5/04 |

* cited by examiner

*Primary Examiner* — Ammar T Hamid
(74) *Attorney, Agent, or Firm* — Frank Gao, Esq.

(57) ABSTRACT

The disclosure is directed to a voice-controlled Bluetooth headset, which includes a receiver, a storage module, an offline voice recognition module, and a Bluetooth module. The offline voice recognition module is used to activate and recognize a preset voice when a preset activation password is received. The Bluetooth module is electrically connected to other modules, and is used for system control, Bluetooth transmission, and processing of instructions output by the preset voice recognition module and performs corresponding functions. With the above structure, the present disclosure can implement voice control of the Bluetooth headset according to a simple preset password, without manual operation, and is simple and convenient to use. The offline voice recognition module can achieve a preset voice control effect by setting a simple preset password, reducing the time required for the voice recognition device to recognize complex voice information, and the user's human-machine interaction experience is better, which further saves the cost required for voice recognition devices.

4 Claims, 2 Drawing Sheets

VOICE-CONTROLLED BLUETOOTH HEADSET

RELATED PATENT APPLICATIONS

This application claims priority date of a Chinese Patent application, which was filed on Nov. 26, 2019 with application number 201922069168.9, which is incorporated by reference herein in its entirety.

TECHNICAL FIELD

This disclosure relates to the technical field of Bluetooth headsets, in particular to a Bluetooth voice-activated headset.

BACKGROUND

At present, with the increasing demand for wireless communication, application of Bluetooth headsets is becoming more and more extensive. Bluetooth headsets are small devices based on Bluetooth technology. It is convenient for users to apply Bluetooth technology to hands-free Bluetooth headsets. It allows users to get rid of the annoying wires and talk freely in various ways. Since the introduction of Bluetooth headsets, Bluetooth headsets have been a good tool for business people to work efficiently and effectively.

However, when the existing touch Bluetooth headset is used to control the headset, the headset needs to be frequently touched for manipulation, which affects the user experience. The cost of implanting a voice recognition module in the headset is high, the time required for the headset to recognize voice information is long, and the size of the headset will increase due to the implantation of the voice recognition module.

Therefore, there is a need to have a voice-controlled Bluetooth headset capable of realizing human-machine interaction.

SUMMARY

In order to overcome the shortcomings of the prior art, this disclosure provides a voice-control Bluetooth headset, which is simple to use and low in cost.

The disclosure provides a voice-controlled Bluetooth headset, which includes a main body. The main body has a receiver, a storage module, an offline voice recognition module, and a Bluetooth module. The receiver is connected to the Bluetooth module and is used to implement audio electrical signals and sound signal conversion. The storage module may be connected to the Bluetooth module for storing system firmware and system configuration files. The offline voice recognition module is electrically connected to the Bluetooth module. The Bluetooth module is used for system control, to activate and recognize the preset voice message when receiving the preset activation password, and output the corresponding instructions.

Optionally, it includes a volume output control module, which is electrically connected to the Bluetooth module. The volume output control module has a number of preset volume output modes and enables or disables a certain pre-volume output according to the instructions of the Bluetooth module.

Optionally, it includes a monaural and binaural mode module, which is electrically connected to the Bluetooth module, and the monaural and binaural mode module has a number of preset monaural and binaural modes, and activates or deactivates a certain pre-set monaural and binaural mode according to the instruction of the Bluetooth module.

Optionally, it includes a sound range mode module, which may be connected to a Bluetooth module. The sound range mode module may have a plurality of sound range modes, and may activate or deactivate a preset sound range mode according to an instruction of the Bluetooth module.

Optionally, it includes a user-defined module, which may be connected to the Bluetooth module, and is configured to set a custom mode according to a customer's preference, and to enable or disable the custom mode according to an instruction of the Bluetooth module.

The beneficial effect of the disclosure is that through the above-mentioned structural setting, when in use, the offline voice recognition module activates and recognizes the preset voice information upon receiving the preset activation password, and outputs corresponding instructions to the Bluetooth module, and the Bluetooth module executes corresponding functions according to the instructions.

With the above structure, the present disclosure can implement voice control of the Bluetooth headset according to a simple preset password, without manual operation, and is simple and convenient to use. The offline voice recognition module can achieve a preset voice control effect by setting a simple preset password, reducing the time required for the voice recognition device to recognize complex voice information, and the user's human-machine interaction experience is better, which further saves the cost required for speech recognition devices, reducing product costs, suitable for ordinary consumers.

BRIEF DESCRIPTION OF THE DRAWINGS

In order to explain the technical solution in the embodiments of the present disclosure more clearly, the drawings used in the description of the embodiments are briefly introduced below. The drawings in the following description are just some embodiments of the present disclosure. Those of ordinary skill in the art can obtain other drawings according to the drawings without creative labor.

The following further describes the disclosure with reference to the drawings and embodiments.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

In order to facilitate the description of the solution of the present disclosure, specific details are listed in the following description in order to explain the solution of the present disclosure. The embodiments of the present application described below can be applied or incorporated into different components, such as programs, circuits, devices, and systems. The structure and components shown in the block diagram are schematic illustrations of a specific embodiment of the present application. It should be understood that the connections between the components in the figure are not limited to direct connections. In addition, those skilled in the art should realize that the embodiments of the present disclosure described below can be implemented or embodied in various ways, such as method flow, equipment, and system.

The connections between components or systems in the diagrams are not limited to direct connections. The data between these components can be modified, reformatted, or otherwise changed by intermediary components. In addition, additional or fewer connections can be used.

Reference to one embodiment, multiple embodiments, or a specific embodiment in this application refers to the specific features, structures, characteristics, or functions described in at least one embodiment of the present disclosure, and may be included in multiple implementation example. In addition, the appearances of the above terms in different places in the specification do not necessarily refer to the same embodiment.

Figure 1:
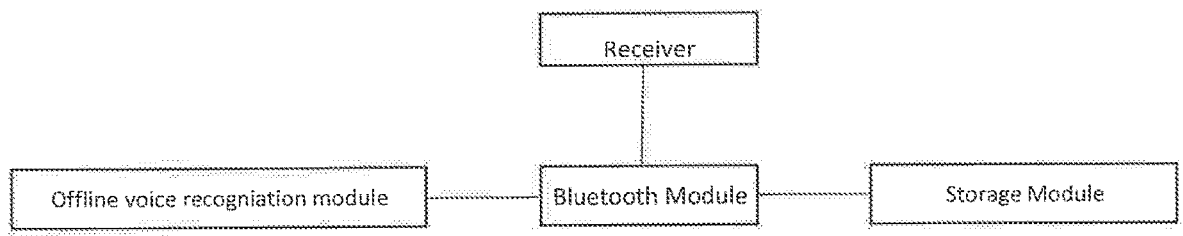
FIG. 1 is a schematic diagram of a module according to an embodiment of the present disclosure.
Figure 2:
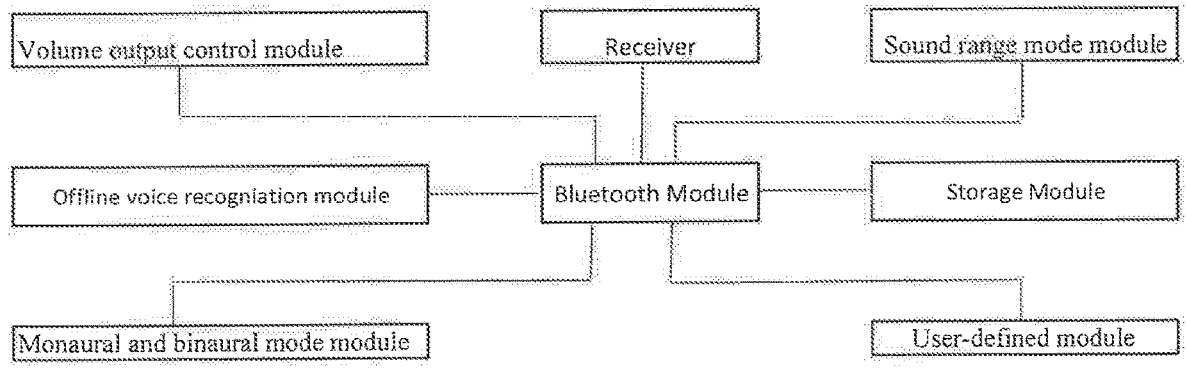
FIG. 2 is a schematic diagram of a module according to another embodiment of the present disclosure.
Figure 3:
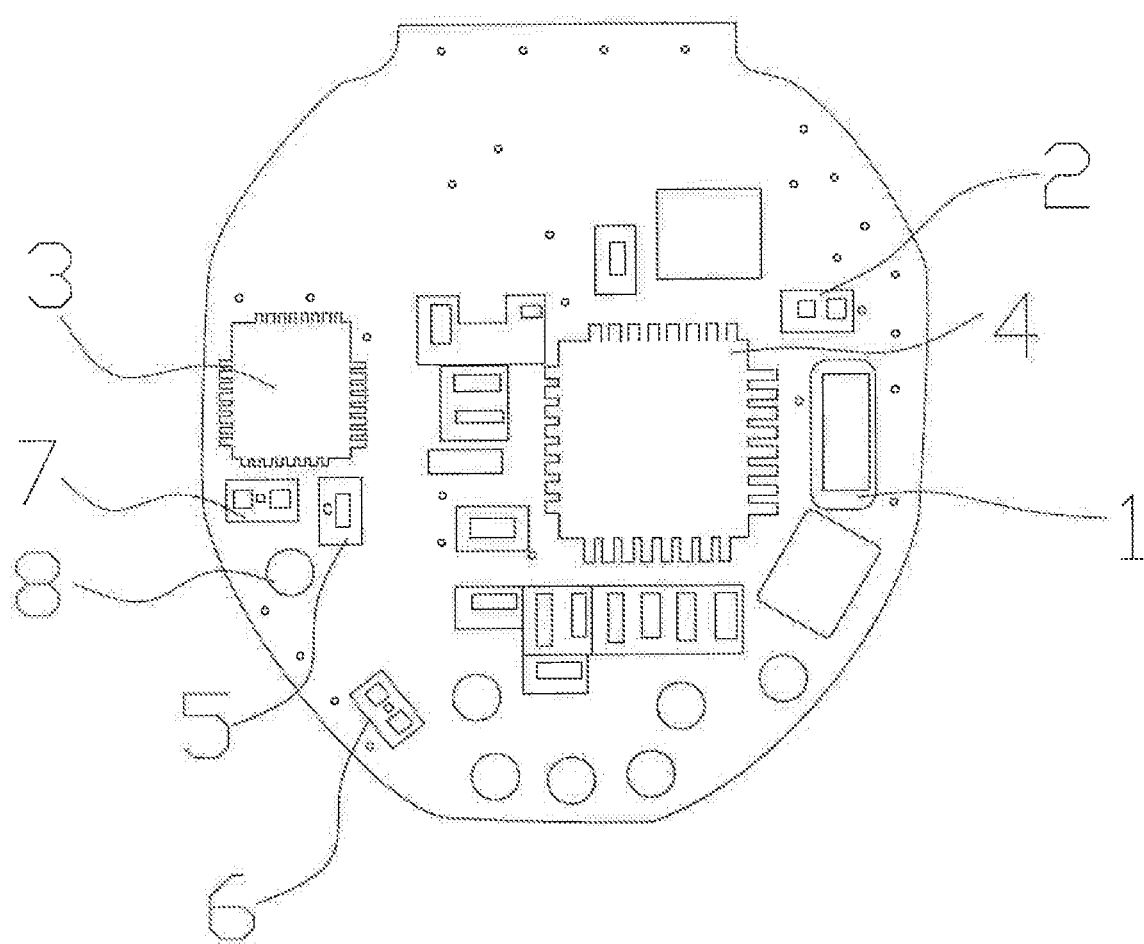
FIG. 3 is a schematic diagram of a printed circuit board (PCB) of the present disclosure.

An embodiment of the present application is shown in FIGS. 1 to 3. A voice-activated Bluetooth headset includes a receiver 1, a storage module 2, an offline voice recognition module 3, and a Bluetooth module 4. The receiver 1 is electrically connected to the Bluetooth module 4 for implementing audio electrical signals and Voice signal conversion. The storage module 2 is electrically connected to the Bluetooth module 4 for storing system firmware and system configuration files, and the offline voice recognition module 3 is electrically connected to the Bluetooth module 4 for receiving a preset activation. When the password is activated, the preset voice information is activated and recognized, and corresponding commands are output to the Bluetooth module 4, which is used for system control, Bluetooth transmission, and processing of commands output by the preset voice recognition module and performs corresponding functions.

With the above structural setting, when in use, the offline voice recognition module activates and recognizes the preset voice information upon receiving the preset activation password, and outputs a corresponding instruction to the Bluetooth module, and the Bluetooth module performs the corresponding function according to the instruction. With the above structure, the present disclosure can implement voice control of the Bluetooth headset according to a simple preset password, without manual operation, and is convenient to use. The offline voice recognition module can achieve a preset voice control effect by setting a simple preset password, reducing the time required for the voice recognition device to recognize complex voice information, the user's human-machine interaction experience is better. The low cost required for a speech recognition device further reduces product costs and is suitable for most ordinary consumers.

In this embodiment, a volume output control module 5 may be further included. The volume output control module 5 is electrically connected to the Bluetooth module 4. The volume output control module 5 has a number of preset volume output modes, according to the instructions of the Bluetooth module 4 to activate or deactivate a preset volume output mode. Preset volume output modes include 0% volume output mode, 25% volume output mode, 50% volume output mode, 75% volume output mode and 100% volume output mode, with a total of five volume output modes, according to the instructions issued by the Bluetooth module 4, the headset volume can be adjusted. When using, users can choose according to their needs by going to the volume output mode corresponding to the command.

The appropriate volume output mode can be quickly adjusted to the volume that users need, reducing the tedious operation of continuously adjusting the volume.

This embodiment may further include a monaural and binaural mode module 6, which is electrically connected to the Bluetooth module 4. The monaural and binaural mode module 6 includes a plurality of preset monaural and binaural modes. According to instructions of Bluetooth module 4, the monaural and binaural mode module 6 enable or disable a pre-set monaural and binaural mode. The preset monaural and binaural modes include the left ear mute mode, right ear mute mode, and a binaural mute mode. When in use, the user can select a certain mode according to the user's needs, quickly mute the left ear, the right ear, or both ears of the Bluetooth headset, and can smoothly hear the external sound when talking with people.

In this embodiment, a range mode module 7 may be included. The range mode module 7 is electrically connected to the Bluetooth module 4. The range mode module 7 sets a number of range modes and enables or disables a certain device according to the instruction of the Bluetooth module 4. The preset range mode can be a normal range mode, a treble boost mode, and a bass boost mode. The user can select a mode according to the music to be listened for, such as treble boost, bass boost or normal range.

In this embodiment, a user-defined module 8 may be further included. The user-defined module 8 is electrically connected to the Bluetooth module, and is used to set a custom mode according to the customer's preference. Users can freely set a certain mode according to their own needs, set the sound range, sound volume, and left and right ear modes, and activate or deactivate this preset custom mode through voice instructions.

As described above, one or more embodiments are provided in combination with specific content, and the specific implementation of the present disclosure is not limited to these descriptions. Any similarity to the method and structure of the disclosure, or the deduction or replacement of several technologies based on the concept of the disclosure, should be regarded as the scope of protection of the disclosure.

The above description is only the preferred embodiments of the present disclosure, and the protection scope of the present disclosure is not limited to the above embodiments, and any technical solution belonging to the idea of the present disclosure belongs to the protection scope of the present disclosure. It should be noted that, for those of ordinary skill in the art, without departing from the principles of the present disclosure, several improvements and retouches should be considered as the protection scope of the present disclosure.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A voice-controlled Bluetooth headset comprising:
a receiver;
a storage module;
an offline voice recognition module;
a Bluetooth module, wherein the receiver is electrically connected to the Bluetooth module, and is used for converting audio electrical signals and sound signals, wherein the storage module, the Bluetooth module, and their electrical connection are used for storing system firmware and system configuration files, wherein the offline voice recognition module is electrically connected to the Bluetooth module for activating and recognizing preset voice information upon receiving a preset activation password, outputting a corresponding instruction to a Bluetooth module, which is used for system control, Bluetooth transmission, and processing of instruction output by a preset voice recognition module and performs corresponding functions; a monaural and binaural mode module wherein the module is electrically connected to the Bluetooth module, wherein the module comprises a plurality of preset monaural and binaural modes, and wherein the module enables or disables pre-set monaural binaural mode according to the Bluetooth module instructions; and a volume output control module, wherein the volume output control module is electrically connected to the Bluetooth module, wherein the volume output control module comprises a plurality of preset volume output modules, wherein the preset volume output modules are activated or deactivated according to instructions of the Bluetooth module wherein present volume output modules comprises about 0% volume output mode, and about 100% volume output mode.

2. The voice-controlled Bluetooth headset according to claim 1, wherein the preset volume output modules further comprises about 25% volume output mode, about 50% volume output mode, about 75 volume output mode.

3. The voice-controlled Bluetooth headset according to claim 1 further comprising:
a range mode module, wherein the range mode module is electrically connected to the Bluetooth module, and the range module has a plurality of preset range modes, wherein the range mode module activates or deactivates a preset range mode according to instructions of the Bluetooth module.

4. The voice-activated Bluetooth headset according to claim 1 further comprising:
a user-defined module, wherein the user-defined module is electrically connected to the Bluetooth module for setting a custom mode according to a customer's preference and the instructions of the Bluetooth module to enable or disable the custom mode.

* * * * *